(12) United States Patent
Ueki et al.

(10) Patent No.: US 11,705,843 B2
(45) Date of Patent: Jul. 18, 2023

(54) DIRECT POWER CONVERSION DEVICE

(71) Applicant: DAIKIN INDUSTRIES, LTD., Osaka (JP)

(72) Inventors: Daisuke Ueki, Osaka (JP); Nobuo Hayashi, Osaka (JP); Takurou Ogawa, Osaka (JP); Morimitsu Sekimoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 82 days.

(21) Appl. No.: 17/472,392

(22) Filed: Sep. 10, 2021

(65) Prior Publication Data

US 2021/0408953 A1 Dec. 30, 2021

Related U.S. Application Data

(63) Continuation of application No. PCT/JP2020/008871, filed on Mar. 3, 2020.

(30) Foreign Application Priority Data

Mar. 14, 2019 (JP) .................................. 2019-046890

(51) Int. Cl.
*H02P 21/22* (2016.01)
*H02P 21/30* (2016.01)
(Continued)

(52) U.S. Cl.
CPC .............. *H02P 21/22* (2016.02); *H02M 7/48* (2013.01); *H02P 21/30* (2016.02); *H02P 27/06* (2013.01)

(58) Field of Classification Search
CPC .......... H02P 21/22; H02P 21/30; H02P 27/06; H02M 7/48

See application file for complete search history.

(56) References Cited

U.S. PATENT DOCUMENTS 6,690,137 B2 * 2/2004 Iwaji ....................... H02P 23/30
318/434
7,151,354 B2 12/2006 Yoshinaga et al.
(Continued)

FOREIGN PATENT DOCUMENTS

EP 2 667 501 A1 11/2013
JP 2007-116862 A 5/2007
(Continued)

OTHER PUBLICATIONS

International Search Report of corresponding PCT Application No. PCT/JP2020/008871 dated Jun. 9, 2020.
(Continued)

*Primary Examiner* — Rina I Duda
(74) *Attorney, Agent, or Firm* — Global IP Counselors, LLP

(57) ABSTRACT

A direct power conversion device includes a control unit. tb=1/|fdc−n×fL|. fdc is a frequency twice as high as a frequency of an AC power supply, fL is a frequency of periodic load fluctuations, and n is a positive integer that maximizes tb. In a half period of power supply during a period of tb, the half period including a timing at which peaks of a fundamental wave of load torque and an absolute value of a power supply voltage substantially coincide with each other, the control unit being configured to control the switching elements so that two or more local maximum points appear in the half period of power supply, in a waveform obtained by combining a second harmonic, a fourth harmonic, and a sixth harmonic of a power supply frequency contained in a waveform of an absolute value of a motor current vector.

3 Claims, 9 Drawing Sheets

(51) Int. Cl.
    *H02M 7/48*           (2007.01)
    *H02P 27/06*         (2006.01)

(56) References Cited

U.S. PATENT DOCUMENTS

| | | | | |
|---|---|---|---|---|
| 7,545,113 | B2 * | 6/2009 | Garlow | H02M 1/12 |
| | | | | 318/632 |
| 7,786,691 | B2 * | 8/2010 | Garlow | H02P 21/22 |
| | | | | 318/632 |
| 8,098,035 | B2 * | 1/2012 | Sekimoto | H02P 29/50 |
| | | | | 318/434 |
| 2002/0074969 | A1 | 6/2002 | Edelson | |
| 2009/0251086 | A1 | 10/2009 | Sekimoto et al. | |
| 2013/0300334 | A1 * | 11/2013 | Tooyama | H02P 29/50 |
| | | | | 318/504 |
| 2017/0279398 | A1 * | 9/2017 | Taniguchi | H02M 7/06 |

FOREIGN PATENT DOCUMENTS

| | | | |
|---|---|---|---|
| JP | 4192979 | A | 10/2008 |
| JP | 2012-165631 | A | 8/2012 |
| JP | 2017-103910 | A | 6/2017 |

OTHER PUBLICATIONS

International Preliminary Report of corresponding PCT Application No. PCT/JP2020/008871 dated Sep. 23, 2021.
European Search Report of corresponding EP Application No. 20 77 0796.9 dated Sep. 16, 2022.

\* cited by examiner

DIRECT POWER CONVERSION DEVICE

CROSS-REFERENCE TO RELATED APPLICATIONS

This is a continuation of International Application No. PCT/JP2020/008871 filed on Mar. 3, 2020, which claims priority to Japanese Patent Application No. 2019-046890, filed on Mar. 14, 2019. The entire disclosures of these applications are incorporated by reference herein.

BACKGROUND

Field of Invention

The present disclosure relates to a direct power conversion device.

Background Information

Power conversion devices that convert power, input thereto from an alternating current (AC) power supply, to AC power having a predetermined frequency are roughly classified into indirect power conversion devices and direct power conversion devices, depending on the presence or absence of an energy storage element (e.g., a large-capacity capacitor or a large-capacity inductor). The indirect power conversion devices have an energy storage element (e.g., a large-capacity capacitor or a large-capacity inductor), and the direct power conversion devices do not have such an energy storage element. Some types of the direct power conversion devices have, at a DC link unit, a capacitor with a relatively small capacity. Patent Document 1 discloses a torque control technique applied to a direct power conversion device, for reducing vibrations of a compressor in a case where load torque fluctuates periodically. According to the torque control of Japanese Patent No. 4192979, ripple components resulting from a frequency of the AC power supply and ripple components in sync with load torque fluctuations that occur in one rotation of the motor are superimposed on the output torque of the motor, thereby changing the output torque of the motor according to the load torque fluctuations of the motor.

SUMMARY

A first aspect of the present disclosure is directed to a direct power conversion device configured to convert power of a single-phase AC power supply input to the direct power conversion device into AC power having a predetermined frequency through a switching operation of a plurality of switching elements and to supply converted power to a motor configured to drive a load having periodic load fluctuations. The direct power conversion device includes a control unit configured to control the switching operation in accordance with $tb=1/|fdc-n \times fL|$, with fdc being a frequency twice as high as a frequency of the AC power supply, fL being a frequency of the periodic load fluctuations, and n being a positive integer that maximizes tb. In a half period of power supply during a period of tb, the half period of power supply including a timing at which a peak of a fundamental wave of load torque and a peak of an absolute value of a power supply voltage substantially coincide with each other, the control unit is configured to control the switching elements so that two or more local maximum points appear in the half period of power supply, in a waveform obtained by combining a second harmonic, a fourth harmonic, and a sixth harmonic of a power supply frequency contained in a waveform of an absolute value of a motor current vector.

DETAILED DESCRIPTION OF EMBODIMENT(S)

First Embodiment

Figure 1:
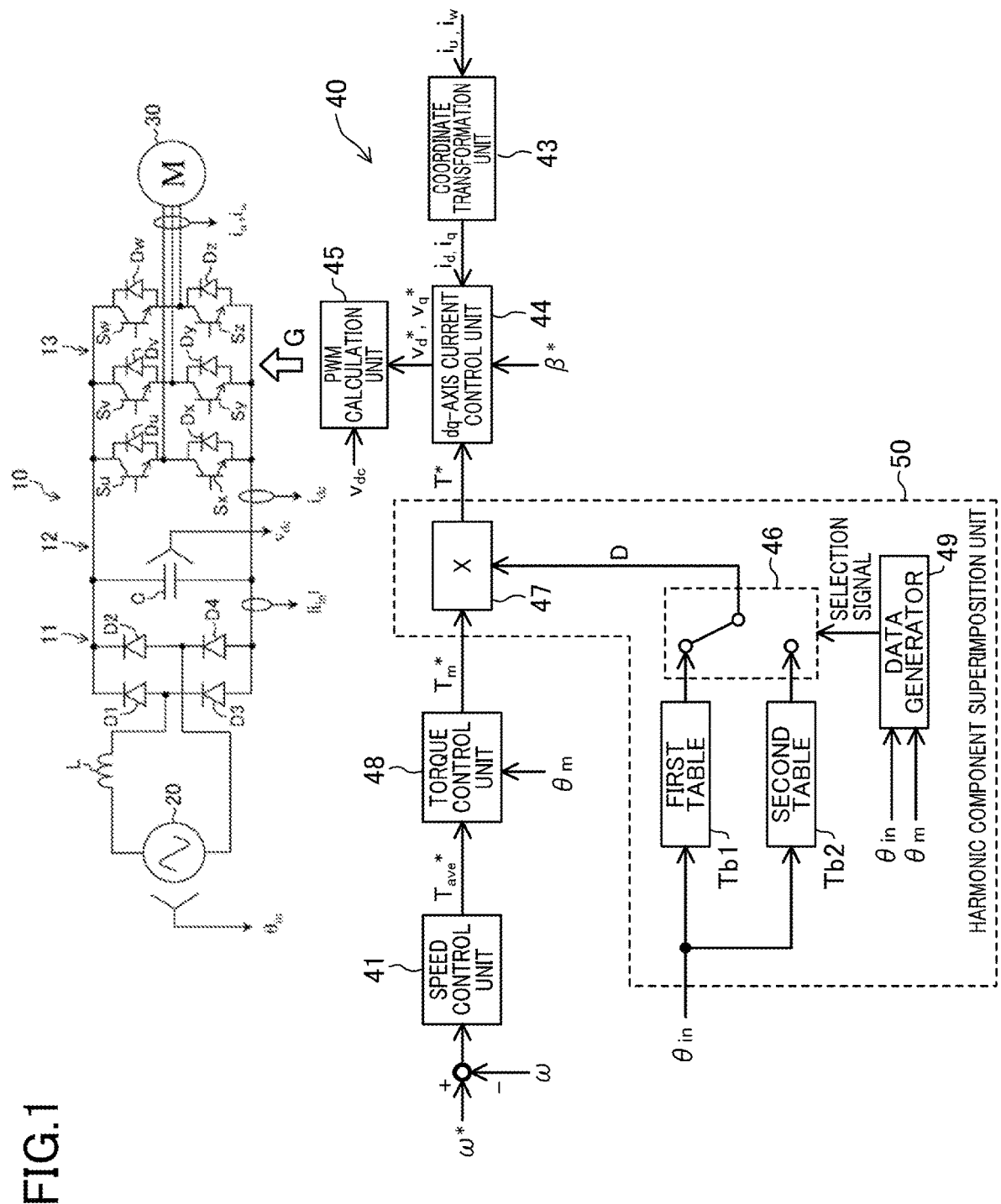
FIG. 1 is a block diagram illustrating a power conversion device.

FIG. 1 is a block diagram illustrating a power conversion device (10) according to a first embodiment. The power conversion device (10) converts an input AC voltage (power supply voltage ($v_{in}$)) to a predetermined AC voltage. More specifically, the power conversion device (10) is a "direct power conversion device" without an energy storage element (e.g., a large-capacity capacitor or a large-capacity inductor). In this example, the power conversion device (10) receives an AC voltage from a single-phase AC power supply (20). The power conversion device (10) supplies the converted AC voltage to a motor (30).

As illustrated in FIG. 1, the power conversion device (10) includes a converter circuit (11), a DC link unit (12), an inverter circuit (13), and a control unit (40). The motor (30) is, for example, an interior permanent magnet motor (IPM motor). In the present embodiment, the motor (30) drives a compressor (not shown) of an air conditioner. In the compressor in a compression phase of a fluid, the torque of the load (i.e., the compressor) fluctuates periodically (i.e., fluctuations of the load torque occur) in one rotation of the motor (30).

Converter Circuit

The converter circuit (11) is connected to the AC power supply (20) via a reactor (L). The converter circuit (11) is a full-wave rectifier for the power supply voltage ($v_{in}$) from the AC power supply (20). The converter circuit (11) includes four diodes (D1, D2, D3, D4). The four diodes (D1, D2, D3, D4) are connected in a bridge configuration.

DC Link Unit

The DC link unit (12) has a capacitor (C). The capacitor (C) is connected to a portion between a pair of output nodes of the converter circuit (11). The DC link unit (12) generates a DC voltage ($v_{dc}$) from an output of the converter circuit (11) (from the full-wave rectified power supply voltage ($v_{in}$)).

The capacitance value of the capacitor (C) is not so large as to enable smoothing of the output from the converter circuit (11). On the other hand, the capacitance value of the capacitor (C) is large enough to enable reduction in a ripple voltage resulting from a switching operation (which will be described later) of the inverter circuit (13). The ripple voltage is voltage fluctuations associated with switching frequencies. Specifically, the capacitor (C) has a capacitance value (e.g., several tens of µF or so) that is about 0.01 times a capacitance value of a smoothing capacitor (e.g., an electrolytic capacitor) for use in a typical power converter to smooth an output from a converter circuit. For example, a film capacitor is used as the capacitor (C).

According to the capacitor (C) mentioned above, the output from the converter circuit (11) is hardly smoothed at the DC link unit (12). The DC voltage ($v_{dc}$) includes residual ripple components corresponding to the frequency of the power supply voltage ($v_{in}$).

Figure 2:
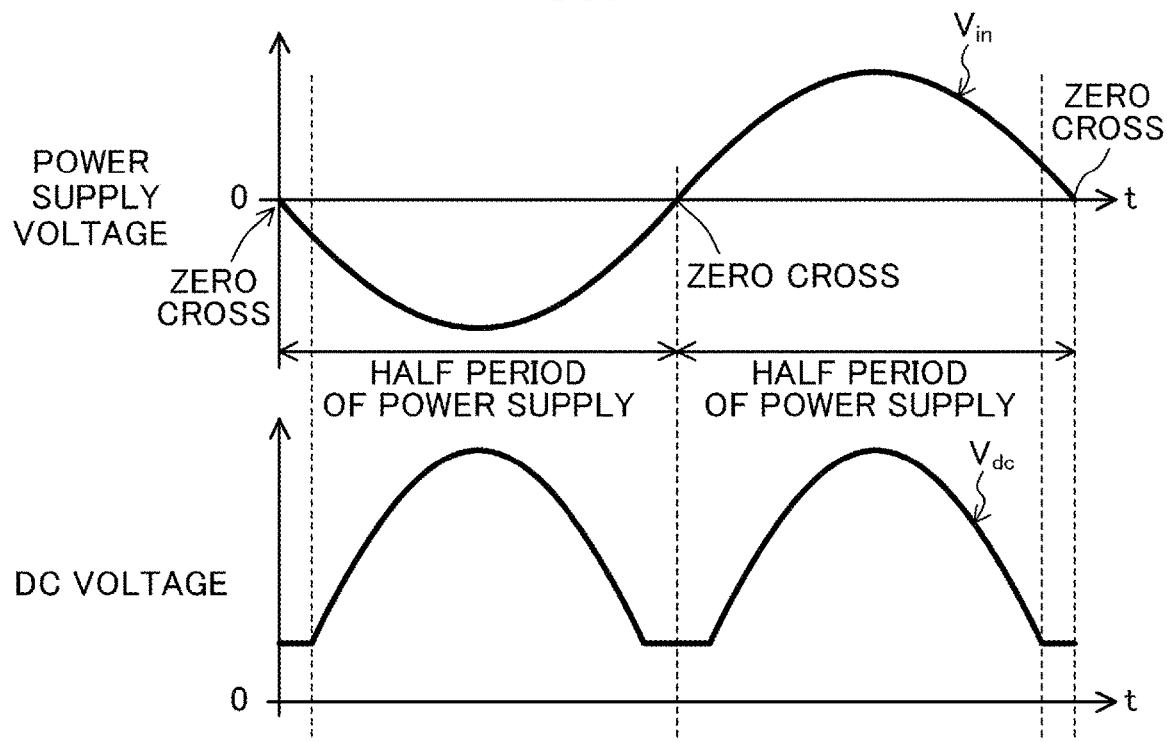
FIG. 2 shows exemplary waveforms of a power supply voltage and a direct current (DC) voltage.

FIG. 2 shows exemplary waveforms of the power supply voltage ($v_{in}$) and the DC voltage ($v_{dc}$). In this example, the DC voltage ($v_{dc}$) pulsates so that its maximum value is higher than or equal to twice its minimum value. The DC voltage ($v_{dc}$) contains ripple components having a frequency twice as high as a frequency of the power supply voltage ($v_{in}$).

Inverter Circuit

The inverter circuit (13) converts, by a switching operation, the DC voltage ($v_{dc}$) generated by the DC link unit (12) into a three-phase AC voltage. The inverter circuit (13) supplies the three-phase AC voltage to the motor (30).

The inverter circuit (13) includes six switching elements (Su, Sv, Sw, Sx, Sy, Sz) and six freewheeling diodes (Du, Dv, Dw, Dx, Dy, Dz). The six switching elements (Su, Sv, Sw, Sx, Sy, Sz) are connected in a bridge configuration. More specifically, the inverter circuit (13) has three switching legs. Each switching leg includes two switching elements connected to each other in series.

Each of the three switching legs includes an upper-arm switching element (Su, Sv, Sw) and a lower-arm switching element (Sx, Sy, Sz), and midpoints between the upper and lower switching elements are connected to coils of respective phases (i.e., u-phase, v-phase, and w-phase coils) of the motor (30). Each of the freewheeling diodes (Du, Dv, Dw, Dx, Dy, Dz) is connected in antiparallel to a corresponding one of the switching elements (Su, Sv, Sw, Sx, Sy, Sz).

Control Unit

The control unit (40) controls the AC voltage output from the inverter circuit (13) so that the number of revolutions (ω) of the motor (30) falls at a given command value (hereinafter, a command value (ω*) of the number of revolutions). To control the number of revolutions (ω), the control unit (40) varies the output torque of the motor (30) by controlling the switching operation.

The control unit (40) includes a microcomputer and a memory device. The memory device stores software programs for operating the microcomputer. The control unit (40) executes the software programs to function as a speed control unit (41), a coordinate transformation unit (43), a dq-axis current control unit (44), a PWM calculation unit (45), a torque control unit (48), and a harmonic component superimposition unit (50) (see FIG. 1).

The speed control unit (41) generates a command value (hereinafter, an average torque command value ($T_{ave}$*)) for an average value of the torque of the motor (30) (hereinafter, an average motor torque ($T_{ave}$)). Specifically, the speed control unit (41) generates the average torque command value ($T_{ave}$*) by, for example, PID calculation (proportional, integral, differential) based on the deviation between the number of revolutions (ω) of the motor (30) and the command value (ω*) of the number of revolutions. The speed control unit (41) outputs the average torque command value ($T_{ave}$*) to the torque control unit (48).

The torque control unit (48) superimposes the vibration reduction components on the average torque command value ($T_{ave}$*) to generate a command value for the torque of the motor (30) (hereinafter, a first torque command (Tm*)). The first torque command (Tm*) pulsates in sync with load fluctuations (i.e., torque fluctuations) of the compressor. Such superimposition causes the ripple components synchronized with the load fluctuations (i.e., the torque fluctuations) of the compressor to appear in the output torque of the motor (30). The vibration reduction components have a pulsating waveform in sync with the load fluctuations (i.e., the torque fluctuations) of the compressor. The vibration reduction components are calculated based on a mechanical angle (θm) of the motor (30). The mechanical angle (θm) of the motor (30) may be detected by a sensor or may be calculated based on the motor current (iu, iv, iw) and the motor voltage (Vu, Vv, Vw).

Figure 3:
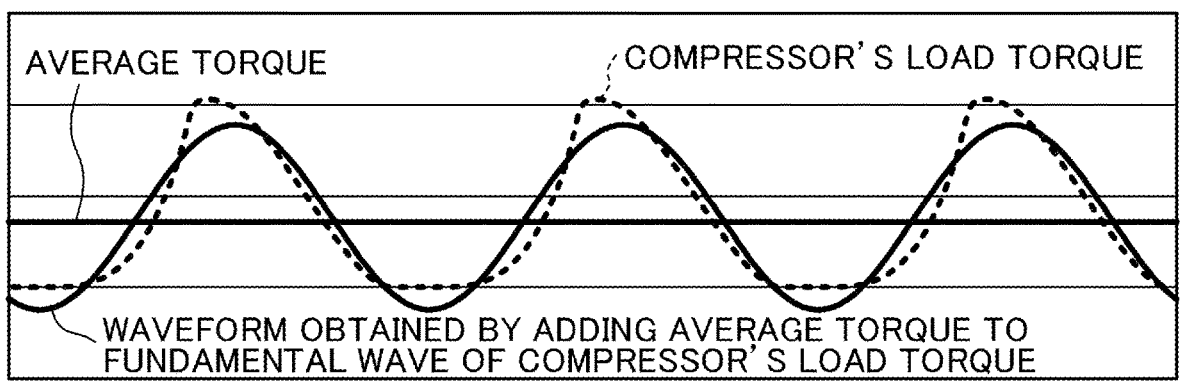
FIG. 3 shows a waveform of compressor's load torque, a waveform obtained by adding average torque to a fundamental wave of the compressor's load torque, and a waveform of the average torque.

FIG. 3 shows the waveform of the compressor's load torque, the waveform obtained by adding the average torque to the fundamental wave of the compressor's load torque, and the waveform of the average torque. As shown in FIG. 3, among the frequency components contained in the waveform of the compressor's load torque, those which have the highest amplitude are the frequency components of the fundamental wave. The deviation between the compressor's load torque and the motor torque becomes vibration torque. The compressor vibrates due to this vibration torque.

In order to reduce the vibration of the compressor caused by the frequency components of the fundamental wave, which have the highest amplitude among the frequency components contained in the waveform of the compressor's load torque, the torque control unit (48) generates a first torque command value (Tm*) that pulsates in sync with the fundamental wave of the compressor's load torque. When the first torque command value (Tm*) pulsates in sync with the fundamental wave of the compressor's load torque, the output torque of the motor (30) pulsates in sync with the fundamental wave of the compressor's load torque. As a result, the vibration torque that causes the vibration of the compressor decreases.

The harmonic component superimposition unit (50) superimposes the harmonic components on the first torque command (Tm*) to generate a torque command (hereinafter, a second torque command (T*)). The second torque command (T*) pulsates in sync with the fluctuations of the absolute value of the power supply voltage, while pulsating in sync with the fundamental wave of the compressor's load torque. Such superimposition causes the ripple components resulting from the frequency of the AC power supply to appear in the output torque of the motor. The harmonic components have a pulsating waveform in sync with the fluctuations of the absolute value of the power supply voltage. The harmonic components are generated based on the power supply phase (θin). The superimposition of the harmonic components by the harmonic component superimposition unit (50) includes two modes.

In one of the modes (hereinafter, the first mode (M1)), the first torque command (Tm*) is modulated so that two or more local maximum points appear in the waveform obtained by combining a second harmonic, a fourth harmonic, and a sixth harmonic of the power supply frequency contained in the waveform of the absolute value of the motor current vector, in a predetermined half period of the power supply (described later). As shown in FIG. 2, the "half period of the power supply" is a period from a predetermined zero cross to the next zero cross in the voltage of the AC power supply (20) (the same applies hereinafter). The "motor current vector" is a resultant vector obtained by combining the vector of a d-axis current ($i_d$) and the vector of a q-axis current ($i_q$) in a case of controlling the motor (30).

In the other mode (hereinafter, the second mode (M2)), the first torque command (Tm*) is modulated so that there is a single local maximum point in the waveform obtained by combining the second harmonic, the fourth harmonic, and the sixth harmonic of the power supply frequency contained in the waveform of the absolute value of the motor current vector, in a predetermined half period of the power supply (described later).

To achieve these two modes, the control unit (40) includes a selector (46), a multiplier (47), and a data generator (49). The control unit (40) further includes two tables for generating data (hereinafter, basic data (D)) for use in the modulation. The basic data (D) is data (signals) containing harmonic components.

One of the two tables is a table (hereinafter, the first table (Tb1)) for generating basic data (D) for the first mode (M1). The other table is a table (hereinafter, the second table (Tb2)) for generating basic data (D) for the second mode (M2). Each of the tables stores values of the power supply phase (θin) and values of the basic data (D) of the power supply phase (θin) in pair. Each of the tables is configured to output, using the power supply phase (θin) as an argument, basic data (D) associated with that power supply phase (θin).

Figure 4:
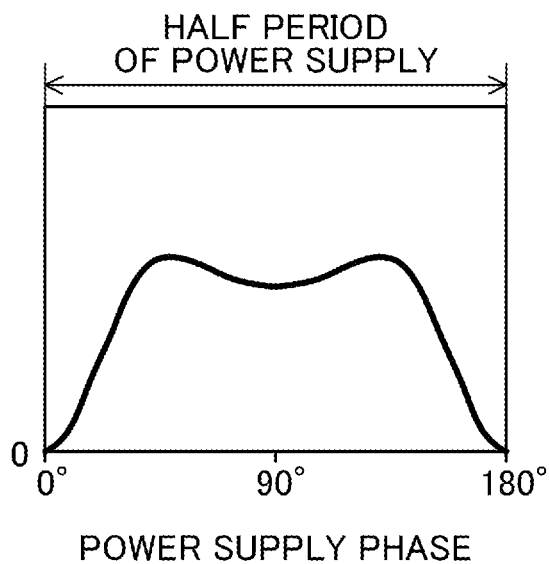
FIG. 4 shows basic data, in a waveform, generated based on a first table.

FIG. 4 shows the basic data (D), in the waveform, generated based on the first table (Tb1). In FIG. 4, the horizontal axis indicates the power supply phase (θin), and the vertical axis indicates a modulation amount. As shown in FIG. 4, the basic data (D) based on the first table (Tb1) includes one local maximum point at each of the first and second halves of the half period of the power supply. The waveform (values in the table) is created by combining waveforms that correspond to the second harmonic, the fourth harmonic, and the sixth harmonic of the power supply frequency so that one or more local maximum points appear in each of the first and second halves of the half period of the power supply.

Figure 5:
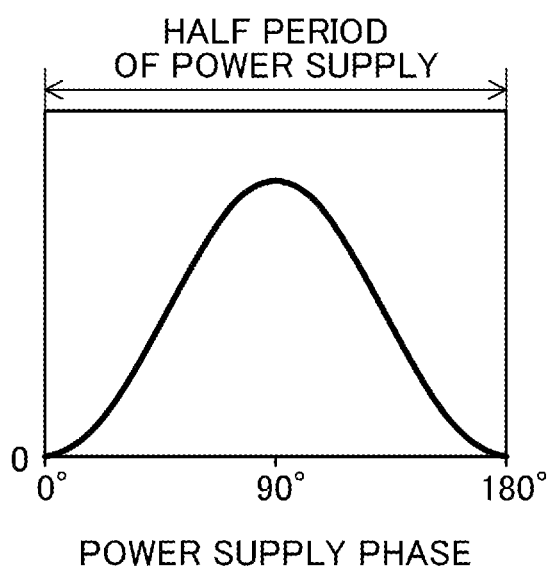
FIG. 5 shows basic data, in a waveform, generated based on a second table.

FIG. 5 shows the basic data (D), in the waveform, generated based on the second table (Tb2). As shown in FIG. 5, the basic data (D) based on the second table (Tb2) includes only one local maximum point in the half period of the power supply. The waveform (values in the table) is created by using the second harmonic of the power supply frequency so that only one local maximum point appears in the half period of the power supply.

The data generator (49) generates a signal (hereinafter, a selection signal) for selecting either one of the two tables (Tb1, Tb2). The generation of the selection signal by the data generator (49) will be described in detail later. The data generator (49) outputs the selection signal to the selector (46).

The selector (46) outputs one of the outputs of the two tables (Tb1, Tb2) to the multiplier (47) in response to the selection signal. The multiplier (47) multiplies the value output from the selector (46) by the first torque command (Tm*). The multiplier (47) outputs, as the second torque command (T*), the resultant value to the dq-axis current control unit (44).

The coordinate transformation unit (43) derives the d-axis current ($i_d$) and the q-axis current ($i_q$) of the motor (30), based on a u-phase current (iu), a w-phase current (iw), and an electrical angle (mechanical angle (θm)) of a rotor (not shown) of the motor (30). The coordinate transformation unit (43) performs dq transformation to derive the d-axis current ($i_d$) and the q-axis current ($i_q$). The values of the u-phase current (iu) and the w-phase current (iw) can be detected by a current sensor, for example.

The dq-axis current control unit (44) derives a d-axis voltage command value ($v_d{*}$) and a q-axis voltage command value ($v_q{*}$), based on the second torque command (T*), the d-axis current ($i_d$), the q-axis current ($i_q$), and a command value (3*) of the phase (0) of the motor current vector. Specifically, the dq-axis current control unit (44) determines, based on the second torque command (T*), a target value of the d-axis current necessary to achieve the torque (which will be referred to as a d-axis current command value ($i_d{*}$)) and a target value of the q-axis current (which will be referred to as a q-axis current command value ($i_q{*}$)). The dq-axis current control unit (44) derives the d-axis voltage command value ($v_d{*}$) and the q-axis voltage command value ($v_q{*}$) in such a manner that reduces the deviation between the d-axis current command value ($i_d{*}$) and the d-axis current ($i_d$) and the deviation between the q-axis current command value ($i_q{*}$) and the q-axis current ($i_q$).

The PWM calculation unit (45) controls ON/OFF operations of the switching elements (Su, Sv, Sw, Sx, Sy, Sz) by so-called pulse width modulation (PWM) control so that the output voltages fall into the voltages commanded by the d-axis voltage command value ($v_d{*}$) and the q-axis voltage command value ($v_q{*}$). The PWM calculation unit (45) generates a signal (hereinafter, a control signal (G)) for controlling the ON/OFF operations.

The period in which the switching elements (Su, Sv, Sw, Sx, Sy, Sz) are turned on and the period in which the switching elements (Su, Sv, Sw, Sx, Sy, Sz) are turned off are determined depending on a duty ratio of the control signal (G). The PWM calculation unit (45) sets the duty ratio of the control signal (G) to be supplied to each of the switching elements (Su, Sv, Sw, Sx, Sy, Sz), based on the mechanical angle (θm), the DC voltage ($v_{dc}$), the d-axis voltage command value ($v_d^*$), the q-axis voltage command value ($v_q^*$), a d-axis voltage ($v_d$), and a q-axis voltage ($v_q$).

In receipt of the control signal (G), each of the switching elements (Su, Sv, Sw, Sx, Sy, Sz) performs the switching operation (ON/OFF operation) at the duty ratio corresponding to the control signal (G). The PWM calculation unit (45) updates the control signal (G) periodically. The update causes the inverter circuit (13) to perform the switching operation continuously.

Mode Selection

One of the two tables is selected by the selection signal output from the data generator (49). The selection of the table results in the selection of the first mode (M1) or the second mode (M2) by the control unit (40). Hereinafter, for convenience of description, a half period of the power supply in which the first mode (M1) is executed is referred to as a first power supply half period, and a half period of the power supply in which the second mode (M2) is executed is referred to as a second power supply half period. Specifically, the data generator (49) executes the following steps to select either the first table (Tb1) or the second table (Tb2).

Step 1:

The data generator (49) determines, from the power supply phase (θin), a frequency (hereinafter, fdc) twice as high as the frequency of the AC power supply (20). The data generator (49) calculates a frequency (hereinafter, fL) of periodic load fluctuations (the load fluctuations of the compressor in this example) from the mechanical angle (θm).

Figure 6:
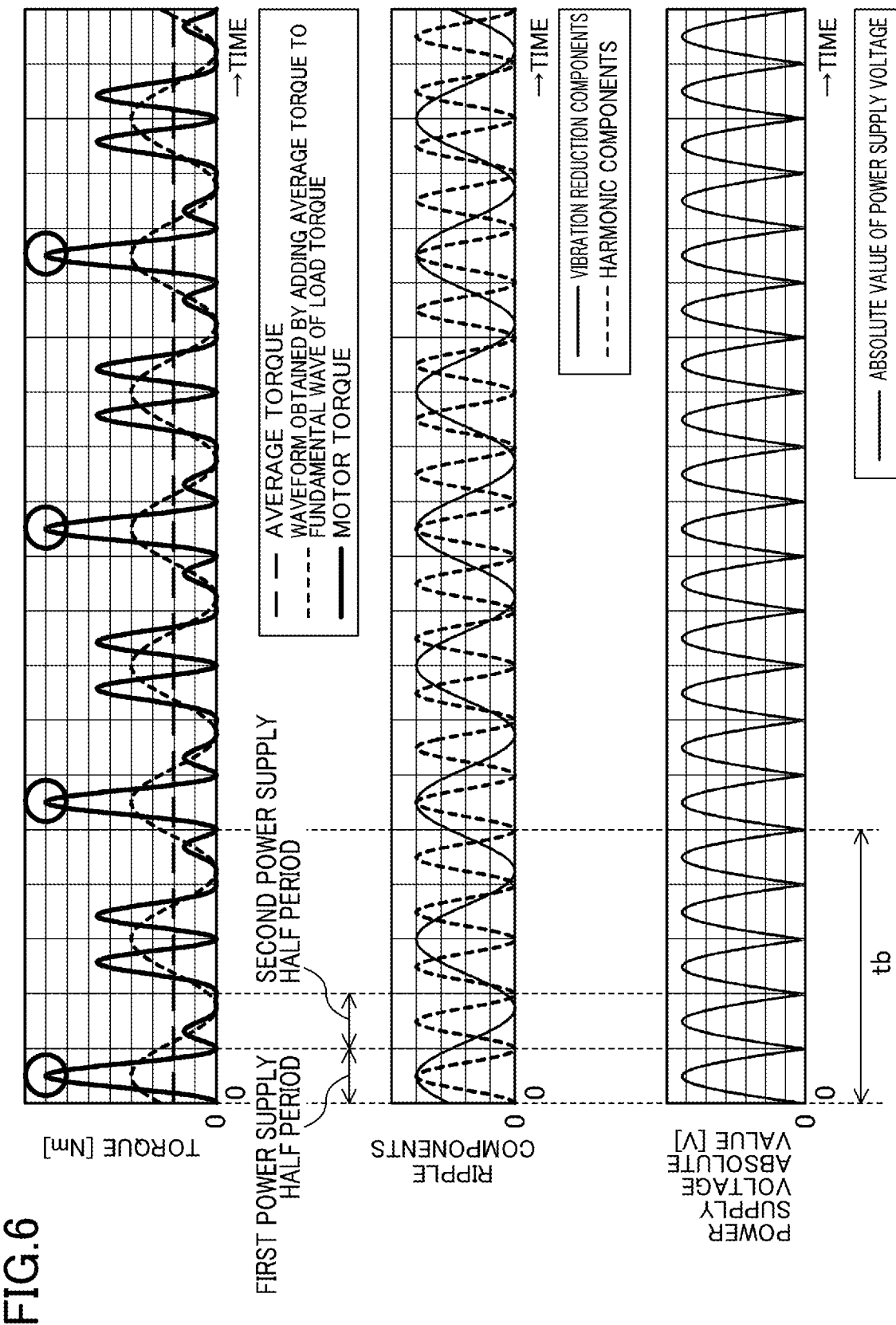
FIG. 6 relates to known technology and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage.

Step 2:

FIG. 6 relates to known technology and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage. The output torque of the motor (30) is the product of the average torque, the vibration reduction components, and the harmonic components. Thus, ripple components resulting from the frequency of the AC power supply and the ripple components in sync with the load torque fluctuations appear in the output torque of the motor (30).

FIG. 6 shows the waveforms of a known power conversion device and illustrates an example in which the data generator (49) generates the basic data (D) by using the second table (Tb2) at all times to operate the power conversion device (10). Hereinafter, for convenience of description, the example in which the power conversion device (10) is operated by using the second table (Tb2) at all times is called a "known example."

Torque control in the direct power conversion device causes the ripple components resulting from the frequency of the AC power supply and the ripple components in sync with the load torque fluctuations that occur in one rotation of the motor, to superimpose on each other. The waveform of the output torque of the motor and the waveform of the motor current therefore result in the waveforms containing beat, as shown in FIG. 6. In the period of the beat (hereinafter, a beat period (tb)), peaks of the output torque of the motor and the motor current (i.e., see the peaks indicated by circles) are high in a half period of the power supply where peaks of the two ripple components coincide with each other.

Specifically, since the output torque of the motor (30) is the product of the average torque, the vibration reduction components, and the harmonic components, the peaks of the output torque of the motor and the motor current are high in the half period of the power supply where peaks of the vibration reduction components and the harmonic components coincide with each other, as shown in FIG. 6. The vibration reduction components have a pulsating waveform in sync with the fundamental wave of the compressor's load torque. The vibration reduction components peak at a timing when the fundamental wave of the compressor's load torque peaks (see FIG. 6).

The harmonic components have a pulsating waveform in sync with the fluctuations of the absolute value of the power supply voltage. The harmonic components peak at a timing when the absolute value of the power supply voltage peaks (see FIG. 6). In other words, the torque control in the direct power conversion device results in that the peaks of the output torque of the motor and the motor current (i.e., see the peaks indicated by circles) are high in the half period of the power supply where peaks of the fundamental wave of the compressor's load torque and the absolute value of the power supply voltage coincide with each other. The data generator (49) determines the beat period (tb) expressed by the following equation.

$$tb=1/|fdc-n \times fL|,$$

where n is a positive integer that maximizes tb. If tb>1 in this equation, tb is set to be equal to one (tb=1).

Step 3:

The data generator (49) determines, based on the mechanical angle (θm), all timings at which the fundamental wave of the load torque peaks (θm=180°) in the beat period (tb).

Step 4:

The data generator (49) determines the power supply phase (θin) at each of the timings determined in Step 3.

Step 5:

The data generator (49) determines a half period of the power supply that includes a power supply phase (θin) closest to the peak of the absolute value of the power supply voltage ($v_{in}$) (the peak corresponding to 90° or 270° in the value of the power supply phase (θin)) within the power supply phase (θin) determined in Step 4. The half period of the power supply determined by the data generator (49) is a half period of the power supply containing a timing at which the peak of the fundamental wave of the load torque and the peak of the absolute value of the power supply voltage substantially coincide with each other. In this embodiment, the half period of the power supply containing the timing at which the peak of the fundamental wave of the load torque and the peak of the absolute value of the power supply voltage substantially coincide with each other is the first power supply half period. The half period of the power supply excluding the first power supply half period is the second power supply half period.

Step 6:

The data generator (49) outputs a selection signal for selecting the first table (Tb1) to the selector (46) in the first power supply half period, and outputs a selection signal for selecting the second table (Tb2) to the selector (46) in the second power supply half period.

In response to the respective selection signals, the selector (46) outputs the basic data (D) from the first table (Tb1) in the first power supply half period, and outputs the basic data (D) from the second table (Tb2) in the second power supply half period. In other words, the first mode (M1) is executed in the first power supply half period, and the second mode (M2) is executed in the second power supply half period.

Example of Operation of Power Conversion Device

When the power conversion device (10) is activated, the converter circuit (11) performs full-wave rectification of the power supply voltage ($v_{in}$). The output of the converter circuit (11) is given to the DC link unit (12). The DC link unit (12) generates a DC voltage ($v_{dc}$) that pulsates at a frequency twice as high as the frequency of the power supply voltage ($v_{in}$).

Further, the speed control unit (41), the torque control unit (48), the coordinate transformation unit (43), the dq-axis current control unit (44), and the harmonic component superimposition unit (50) are operated in the power conversion device (10). As a result, the d-axis voltage command value ($v_d^*$) and the q-axis voltage command value ($v_q^*$) are generated in the control unit (40). Once the d-axis voltage command value ($v_d^*$) and the q-axis voltage command value ($v_q^*$) are generated, the PWM calculation unit (45) generates a control signal (G). As a result, the inverter circuit (13) performs a switching operation in response to the control signal (G). In association with the switching operation, the inverter circuit (13) supplies predetermined AC power to the motor (30).

Figure 7:
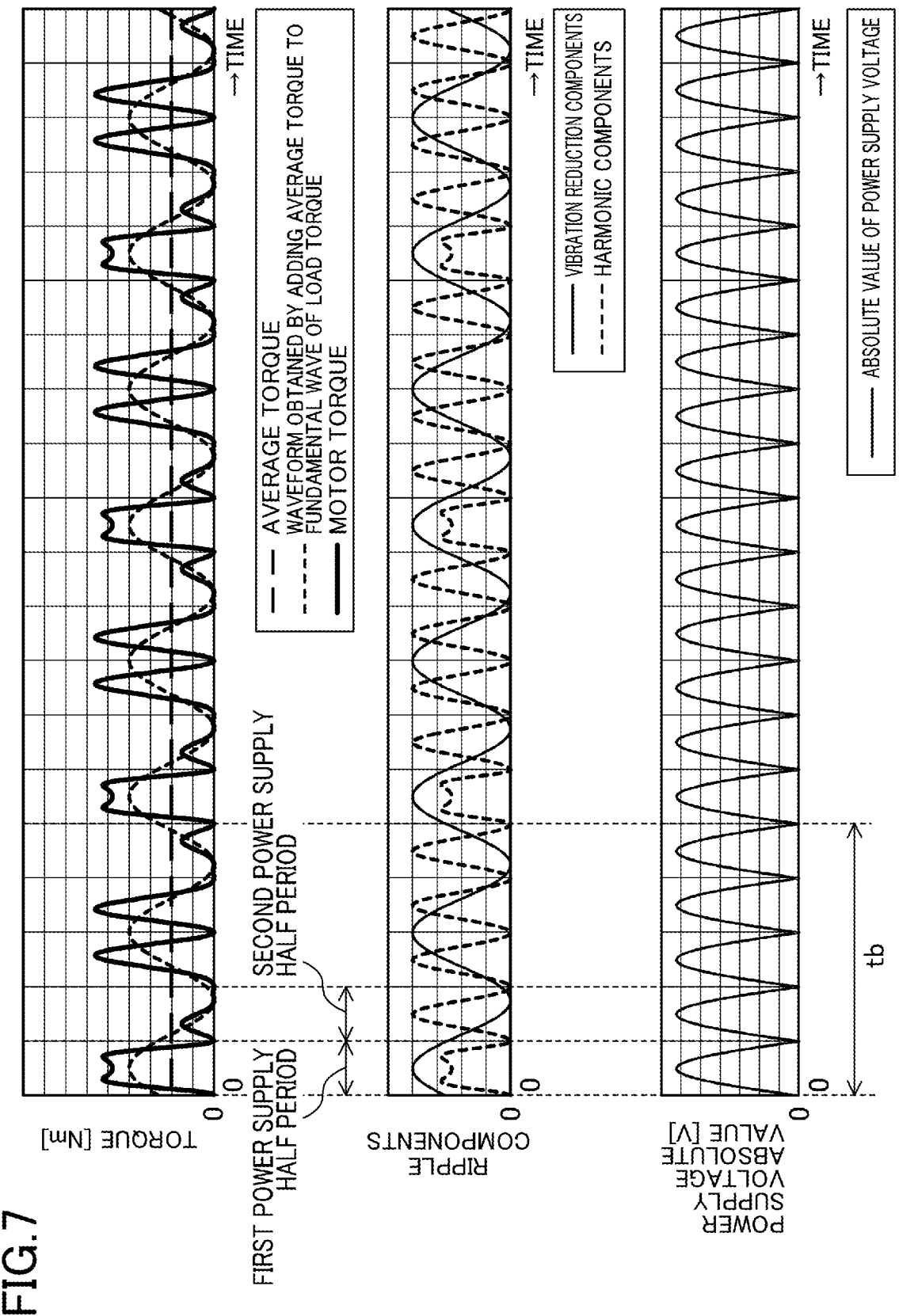
FIG. 7 relates to a first embodiment and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage.

FIG. 7 relates to the present embodiment and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage. The power conversion device (10) of the present embodiment executes the first mode (M1) in the first power supply half period. In the first mode (M1), the basic data (D) based on the first table (Tb1) (see FIG. 4) is used for control. On the other hand, the power conversion device (10) of the known example uses, for control, the basic data (D) based on the second table (Tb2) (see FIG. 5) at all times (see FIG. 6).

In FIG. 6, significant peaks (see the peaks indicated by circles) of the output torque appear in the beat period (tb). The half periods of the power supply including the peaks indicated by the circles each include a timing at which the peak of the fundamental wave of the load torque and the peak of the absolute value of the power supply voltage substantially coincide with each other. In other words, the half period of the power supply including the peaks indicated by the circles is the first power supply half period. On the other hand, in FIG. 7, no significant peak of the output torque appears in the first power supply half period. In other words, peak values of the output torque are reduced in the case of using the basic data (D) based on the first table (Tb1).

As shown in FIGS. 4 and 5, the waveform of the basic data (D) generated based on the first table (Tb1) is a waveform (roughly, a trapezoidal waveform) in which the peak values are less significant as compared with the waveform of the basic data (D) generated based on the second table (Tb2). The output torque of the motor (30) is the product of the average torque, the vibration reduction components, and the harmonic components. It is thus possible to reduce the peak values of the output torque of the motor (30) by making the peak values of the waveform of the harmonic components less significant. In other words, in order to reduce the peak values of the output torque of the motor (30), the waveform of the basic data (D) needs to be generated through proper combining of the amplitudes and phases of the waveforms corresponding to the second harmonic, the fourth harmonic, and the sixth harmonic of the power supply frequency so that the basic data (D) has the waveform with less significant peak values (roughly, a trapezoidal waveform).

Since the output torque and the motor current are substantially proportional to each other, use of the basic data (D) based on the first table (Tb1) for the control results in two or more local maximum points appearing in the first power supply half period in the waveform obtained by combining the second harmonic, the fourth harmonic, and the sixth harmonic of the power supply frequency contained in the waveform of the absolute value of the output torque and the motor current (see FIG. 7). In other words, peak values of the output torque and the motor current are reduced in the case of using the basic data (D) based on the first table (Tb1).

Note that peaks of the output torque of the motor (30) and the motor current are not controlled to be less significant in the second power supply half period in which the second mode (M2) is executed. In this case, there is one local maximum point in the waveform obtained by combining the second harmonic, the fourth harmonic, and the sixth harmonic of the power supply frequency contained in the waveform of the absolute values of the output torque and the motor current. The level of harmonics appearing in the input current (power supply current ($i_{in}$)) to the converter circuit (11) is lower compared with the case under control in the first mode (M1).

In summary, the present embodiment is a direct power conversion device configured to convert power of a single-phase AC power supply (20) input to the direct power conversion device into AC power having a predetermined frequency through a switching operation of a plurality of switching elements (Su, Sv, Sw, Sx, Sy, Sz) and supply converted power to a motor (30) configured to drive a load having periodic load fluctuations, the direct power conversion device including: a control unit (40) configured to control the switching operation, wherein under definitions of: fdc is a frequency twice as high as a frequency of the AC power supply (20); fL is a frequency of the periodic load fluctuations; and tb=1/|fdc−n×fL|, where n is a positive integer that maximizes tb, in a half period of power supply during a period of tb, the half period of power supply including a timing at which a peak of a fundamental wave of load torque and a peak of an absolute value of a power supply voltage substantially coincide with each other, the control unit (40) controls the switching elements (Su, Sv, Sw, Sx, Sy, Sz) so that two or more local maximum points appear in the half period of power supply, in a waveform obtained by combining a second harmonic, a fourth harmonic, and a sixth harmonic of a power supply frequency contained in a waveform of an absolute value of a motor current vector.

Advantages of the Present Embodiment

The power conversion device (10) executes the second mode (M2) in the second power supply half period. In other words, the power conversion device (10) does not actively lower peaks of the motor current in the second power supply half period. However, the power conversion device (10) lowers the peaks of the motor current at least in the first power supply half period. In the power conversion device (10), although the peaks of the motor current are not actively lowered in the second power supply half period, the peaks of the motor current are lowered in terms of the entire operation of the power conversion device (10).

Second Embodiment

In the second embodiment, another exemplary configuration of the control unit (40) will be described. The control unit (40) of the second embodiment controls the switching elements (Su, Sv, Sw, Sx, Sy, Sz) so that two or more local maximum points appear in the waveform obtained by combining a second harmonic, a fourth harmonic, and a sixth harmonic of the power supply frequency contained in the waveform of the absolute value of the motor current vector, in a half period of the power supply including a timing at which the fundamental wave of the load torque is at its maximum. To enable this control, the control unit (40) (more specifically, the data generator (49)) of the first embodiment is modified in the present embodiment.

The data generator (49) of the present embodiment has the function of detecting a timing at which the fundamental wave of the load torque is at its peak. Specifically, the data generator (49) detects a timing at which the mechanical angle ($\theta$m) is 180°. Once the timing at which the fundamental wave of the load torque is at its peak is obtained, the data generator (49) generates a selection signal so that the first table (Tb1) is selected in a half period of the power supply including the obtained timing.

Figure 8:
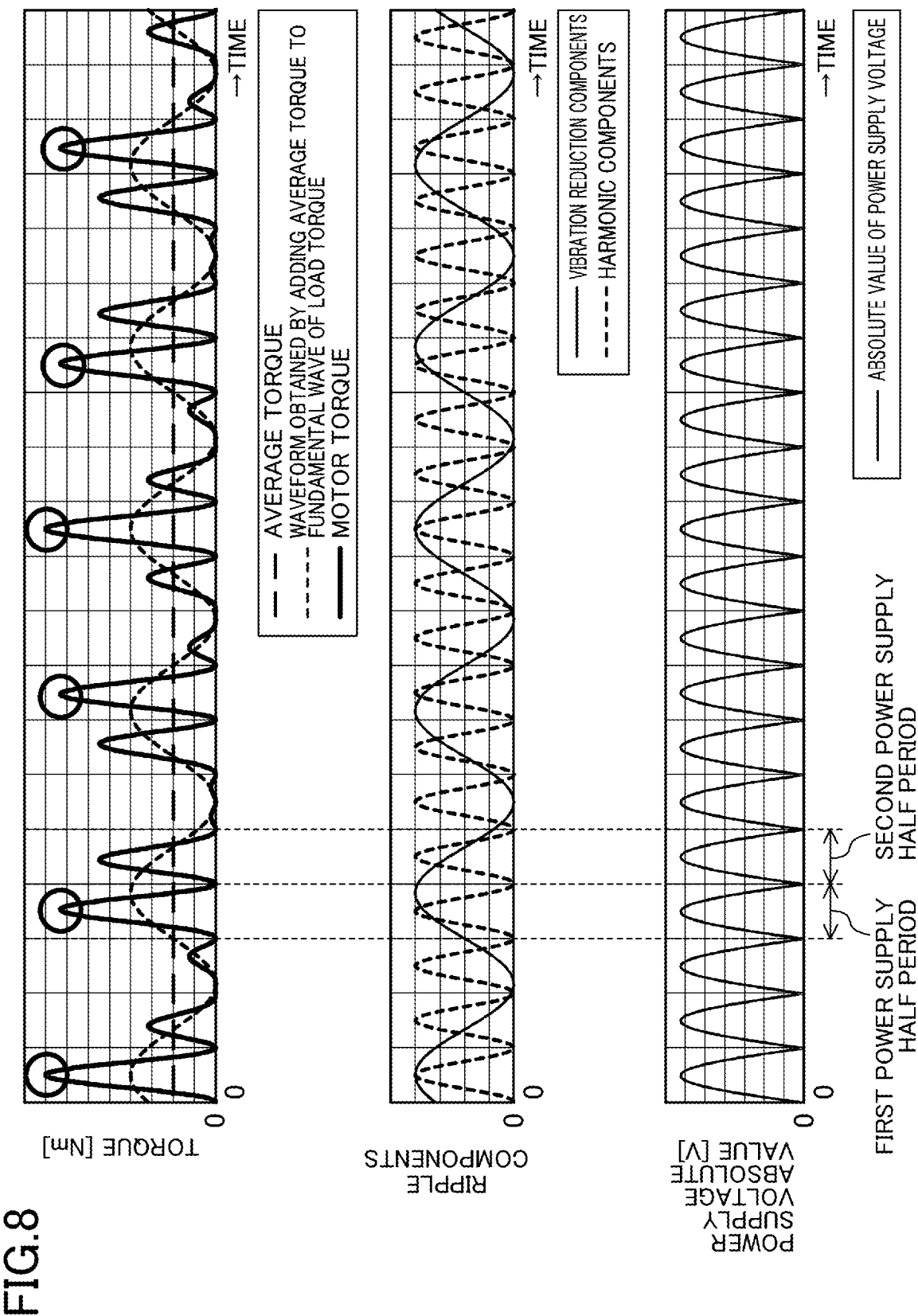
FIG. 8 relates to known technology and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage.
Figure 9:
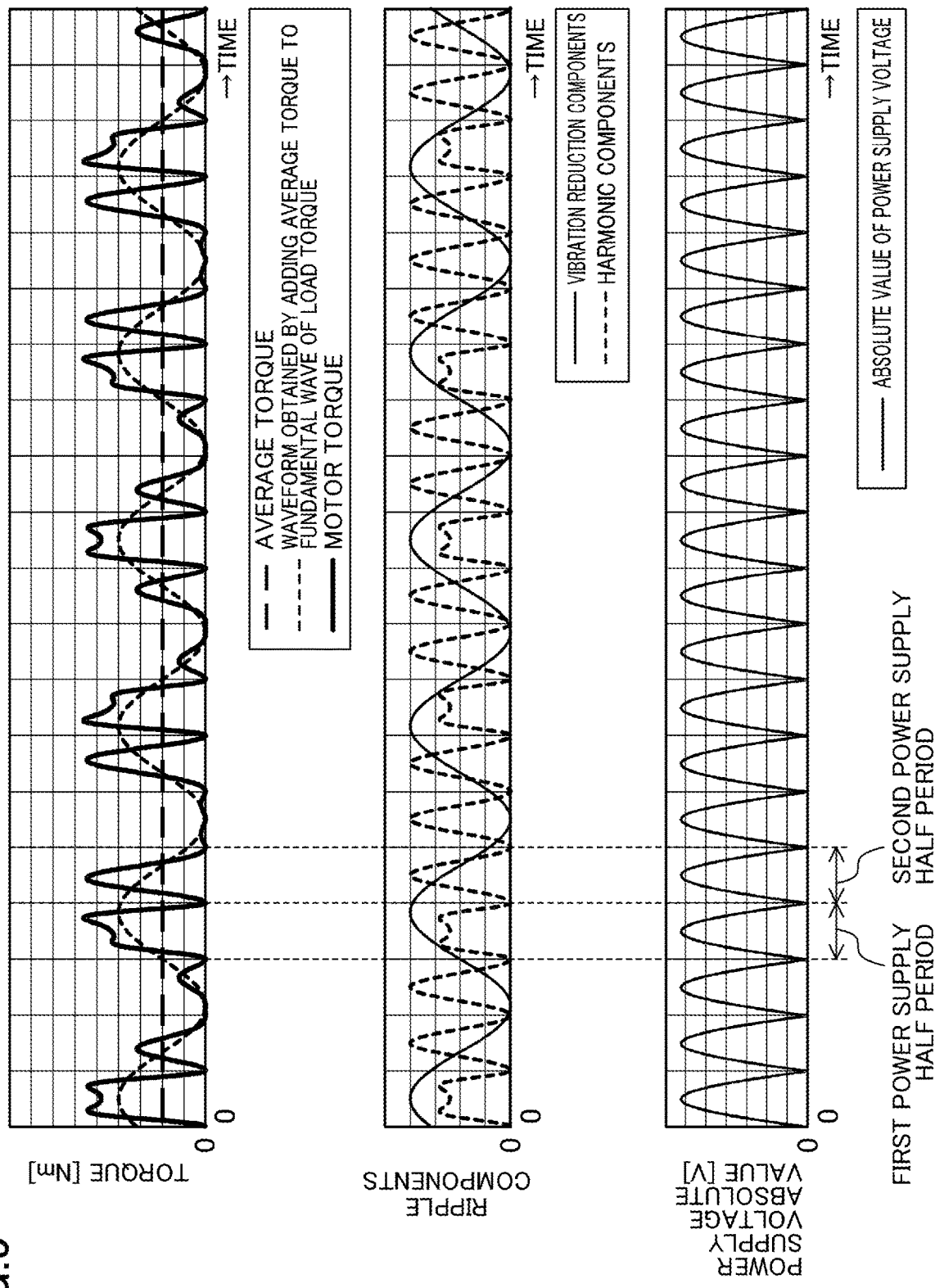
FIG. 9 relates to a second embodiment and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage.

FIG. 8 relates to a known power conversion device and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage. In the waveform of FIG. 8, significant peaks (see the peaks indicated by circles) of the output torque appear. The half periods of the power supply including the peaks indicated by the circles each include a timing at which the fundamental wave of the load torque is at its peak. The waveforms of FIG. 9 relate to the present embodiment and show a waveform of average torque, a waveform obtained by adding the average torque to a fundamental wave of load torque, a waveform of motor torque, a waveform of vibration reduction components, a waveform of harmonic components, and a waveform of absolute values of a power supply voltage.

In the present embodiment, the first mode (M1) is executed in a half period of the power supply including a peak of the fundamental wave of the load torque. In other words, in the present embodiment, the half period of the power supply including the peak of the fundamental wave of the load torque is the first power supply half period, and the half period of the power supply excluding the first power supply half period is the second power supply half period. In the first mode (M1), the basic data (D) based on the first table (Tb1) (see FIG. 4) is used for control. Since the output torque and the motor current are substantially proportional to each other, use of the basic data (D) based on the first table (Tb1) for the control results in two or more local maximum points appearing in the first power supply half period in the waveform obtained by combining the second harmonic, the fourth harmonic, and the sixth harmonic of the power supply frequency contained in the waveform of the absolute values of the output torque and the motor current (see FIG. 9).

In other words, peak values of the output torque and the motor current are reduced in the case of using the basic data (D) based on the first table (Tb1). Note that in the present embodiment, too, the second mode (M2) is executed in an operation period in which the first mode (M1) is not executed.

Advantages of the Present Embodiment

As described above, in the present embodiment, peaks of the motor current are lowered in a half period of the power supply including a timing at which the fundamental wave of the load torque is at its maximum.

In the present embodiment, too, the power conversion device (10) executes the second mode (M2) in the second power supply half period. In other words, the power conversion device (10) does not actively lower peaks of the motor current in the second power supply half period. However, the power conversion device (10) lowers the peaks of the motor current at least in the first power supply half period. In the power conversion device (10), although the peaks of the motor current are not actively lowered in the second power supply half period, the peaks of the motor current are lowered in terms of the entire operation of the power conversion device (10).

Third Embodiment

In the third embodiment, still another exemplary configuration of the control unit (40) will be described. The control unit (40) of the third embodiment controls the switching elements (Su, Sv, Sw, Sx, Sy, Sz) so that two or more local maximum points appear in the waveform obtained by combining a second harmonic, a fourth harmonic, and a sixth harmonic of the power supply frequency contained in the waveform of the absolute value of the motor current vector, in a half period of the power supply included in a mechanical angle range in which the fundamental wave of the load torque exceeds a predetermined threshold value (a torque threshold value (Tth) described later). To enable this control, the control unit (40) (more specifically, the data generator (49)) of the first embodiment is modified in the present embodiment.

The data generator (49) of the present embodiment has the function of determining a range of the mechanical angle ($\theta$m) (hereinafter, a phase range (R)) in which the fundamental wave of the load torque exceeds a predetermined threshold value. The data generator (49) outputs a selection signal for selecting the first table (Tb1) in a half period of the power supply included in the phase range (R) determined. Specifically, the data generator (49) executes the following steps.

Step 31:

The data generator (49) acquires an upper limit value (hereinafter, a torque upper limit value (Tmax)) of the output torque. The torque upper limit value (Tmax) is stored (set) in, for example, a memory device or the like of the control unit (40). As an example, the torque upper limit value (Tmax) may be set according to the demagnetization resistance of the motor (30), or may be set according to the durability of the switching elements (Su, Sv, Sw, Sx, Sy, Sz).

Step 32:

The data generator (49) determines a threshold value (hereinafter, a torque threshold value (Tth)) of the fundamental wave of the load torque. The equation of "motor torque=first torque command (Tm*)×harmonic components" holds, and the first torque command (Tm*) has a waveform that pulsates in sync with the fundamental wave of the load torque. It is thus possible to predict the range of the mechanical angle ($\theta$m) (i.e., the phase range (R)) in which the motor torque exceeds the torque upper limit value (Tmax) in the case of execution of the second mode (M2) at all times, by comparing a value obtained by dividing the torque upper limit value (Tmax) by the peak value of the harmonic components in the second mode (M2) with the waveform obtained by adding the average torque to the fundamental wave of the load torque.

In other words, it is possible to predict the range of the mechanical angle (θm) (i.e., the phase range (R)) in which the motor torque exceeds the torque upper limit value (Tmax) in the case of execution of the known example, by comparing a value obtained by subtracting the average torque from the value obtained by dividing the torque upper limit value (Tmax) by the peak value of the harmonic components in the second mode (M2) with the fundamental wave of the load torque. The data generator (49) determines, as the torque threshold value (Tth), the value obtained by subtracting the average torque from the value obtained by dividing the torque upper limit value (Tmax) by the peak value of the harmonic components in the second mode (M2).

Step 33:

The data generator (49) determines the range of the mechanical angle (θm) (i.e., the phase range (R)) in which the first mode (M1) should be executed. Specifically, the data generator (49) determines a phase range in which the fundamental wave of the load torque exceeds the torque threshold value (Tth), as a range (R). The phase range (R) determined by the data generator (49) is herein assumed to be [θ1, θ2].

Step 34:

The data generator (49) determines a half period of the power supply where a timing at which the absolute value of the power supply voltage ($v_{in}$) is at its peak (the peak corresponding to 90° or 270° in the value of the power supply phase (θin)) is included in the phase range (R).

Figure 10:
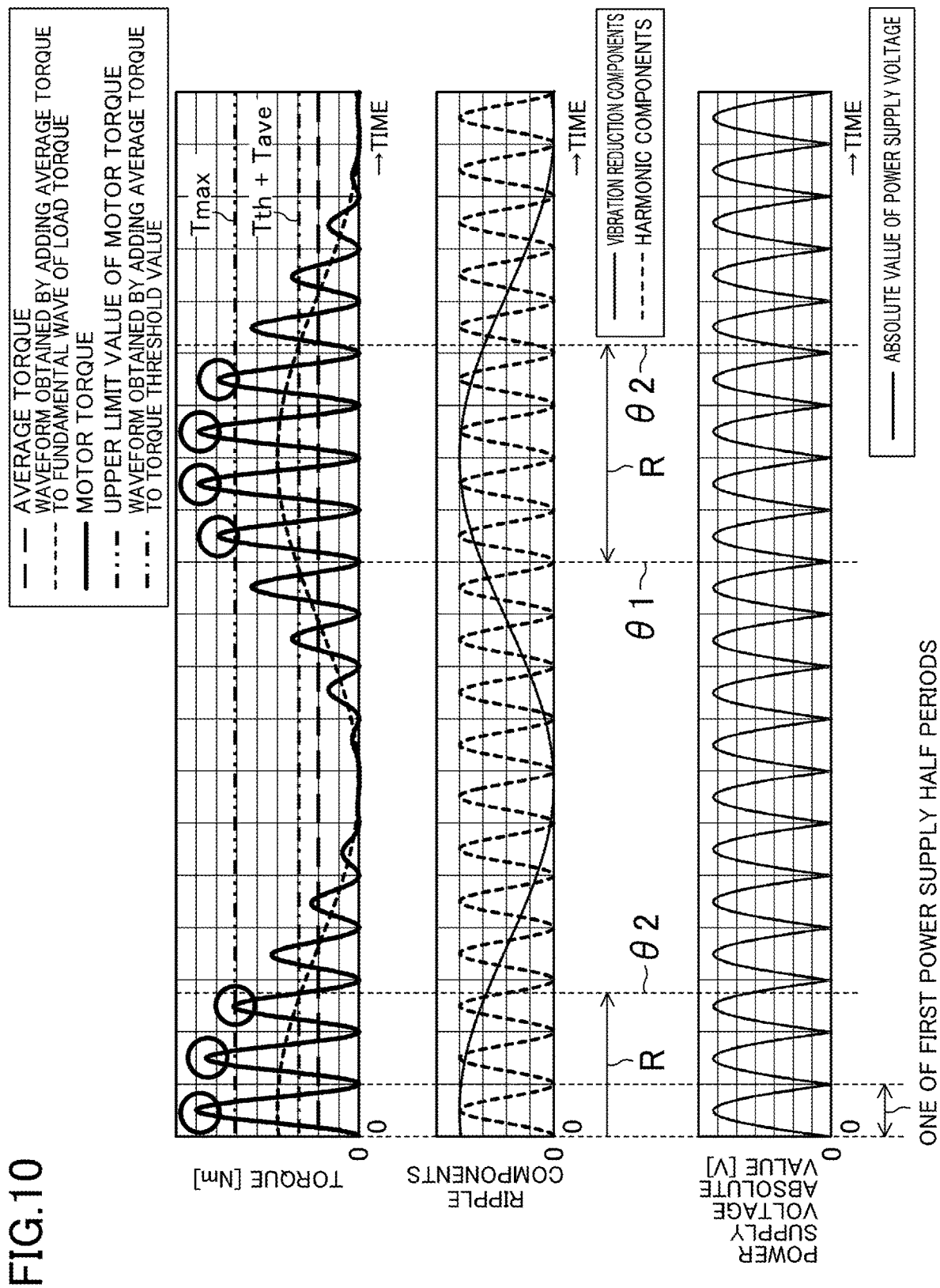
FIG. 10 relates to known technology and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage.
Figure 11:
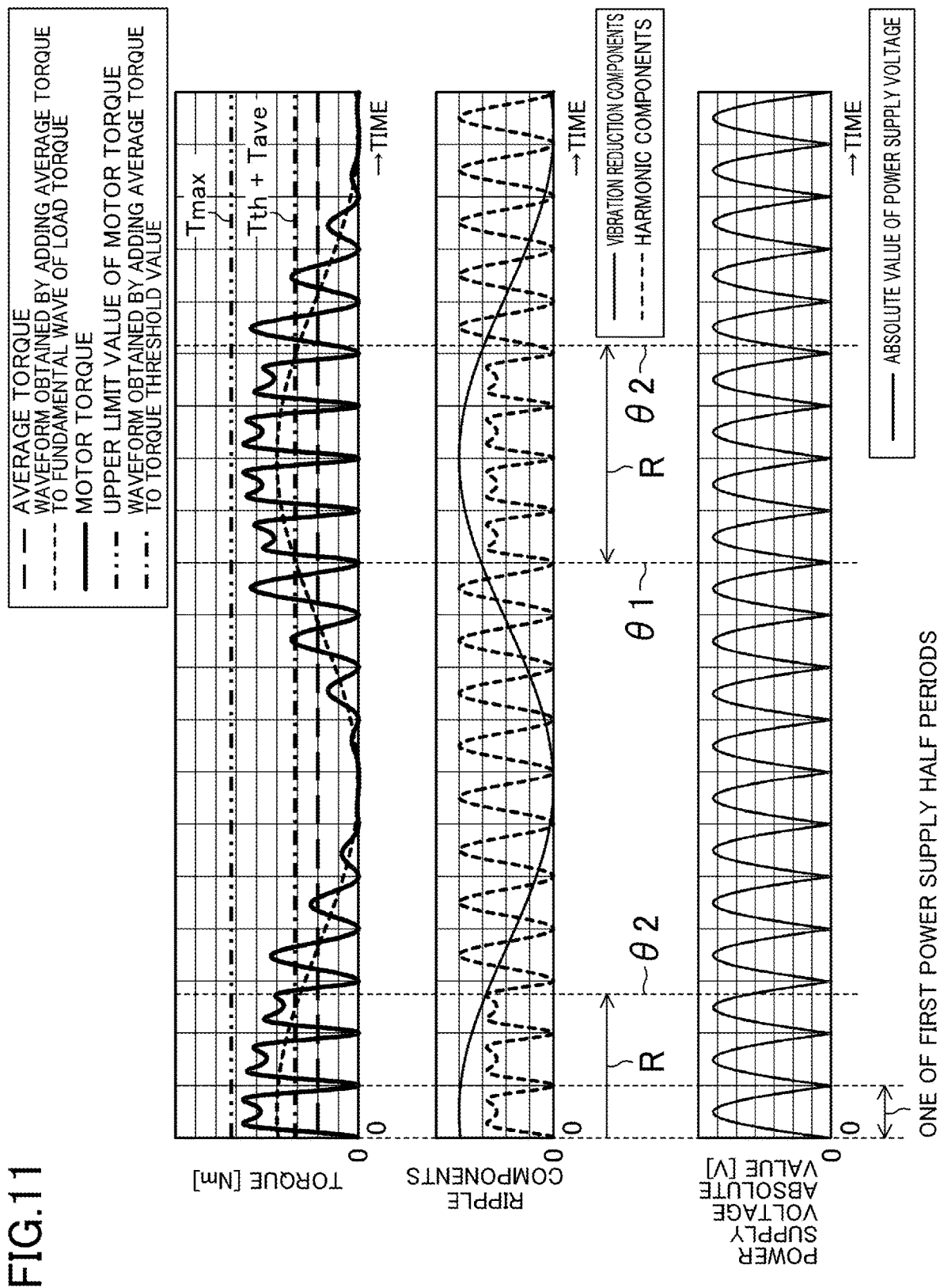
FIG. 11 relates to a third embodiment and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage.

FIG. 10 relates to a known power conversion device and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage. In the waveform of FIG. 10, significant peaks (see the peaks indicated by circles) of the output torque appear. The half periods of the power supply including the peaks indicated by the circles are those included in the phase range (R) in which the fundamental wave of the load torque exceeds the torque threshold value (Tth). FIG. 11 relates to the present embodiment and shows a waveform of average torque, a waveform obtained by adding the average torque to a fundamental wave of load torque, a waveform of motor torque, a waveform of vibration reduction components, a waveform of harmonic components, and a waveform of absolute values of a power supply voltage.

In the present embodiment, the first mode (M1) is executed in the half periods of the power supply included in the phase range (R) in which the fundamental wave of the load torque exceeds the torque threshold value (Tth). In other words, in the present embodiment, each of the half periods of the power supply included in the phase range (R) in which the fundamental wave of the load torque exceeds the torque threshold value (Tth) is the first power supply half period. The half period of the power supply excluding the first power supply half period is the second power supply half period.

In the first mode (M1), the basic data (D) based on the first table (Tb1) (see FIG. 4) is used for control. Since the output torque and the motor current are substantially proportional to each other, use of the basic data (D) based on the first table (Tb1) for the control results in two or more local maximum points appearing in the first power supply half period in the waveform obtained by combining the second harmonic, the fourth harmonic, and the sixth harmonic of the power supply frequency contained in the waveform of the absolute values of the output torque and the motor current (see FIG. 11).

In other words, peak values of the output torque and the motor current are reduced in the case of using the basic data (D) based on the first table (Tb1). Note that in the present embodiment, too, the second mode (M2) is executed in an operation period in which the first mode (M1) is not executed.

Advantages of the Present Embodiment

As described above, in the present embodiment, the peaks of the motor current are lowered in the half periods of the power supply included in the phase range (R) of the mechanical angle (θm) in which the fundamental wave of the load torque exceeds the torque threshold value (Tth).

In the present embodiment, too, the power conversion device (10) executes the second mode (M2) in the second power supply half period. In other words, the power conversion device (10) does not actively lower peaks of the motor current in the second power supply half period. However, the power conversion device (10) lowers the peaks of the motor current at least in the first power supply half period. In the power conversion device (10), although the peaks of the motor current are not actively lowered in the second power supply half period, the peaks of the motor current are lowered in terms of the entire operation of the power conversion device (10).

Other Embodiments

The basic data (D) may be generated, for example, based on functions in the software programs, instead of the tables.

Since the output torque and the motor current are substantially proportional to each other, the motor current vector, for example, may be used as the command value, the upper limit value, or the threshold value, instead of the command value, the upper limit value, or the threshold value of the torque.

The switching control between the first mode (M1) and the second mode (M2) described in the above embodiments can be employed in a matrix converter, as well. Matrix converters are also an example of the direct power conversion device without an energy storage element (e.g., a large-capacity capacitor or a large-capacity inductor).

The application of the power conversion device (10) is not limited to the power supply to a compressor motor. The power conversion device (10) is applicable to power supply to motors of various purposes.

While embodiments and variations have been described above, it will be understood that various modifications in form and detail may be made without departing from the spirit and scope of the present disclosure as set forth in the appended claims. The foregoing embodiment and variations thereof may be combined and replaced with each other without deteriorating the intended functions of the present disclosure.

As can be seen from the foregoing description, the present disclosure is useful for a power conversion device.

The invention claimed is:

1. A direct power conversion device configured to convert power of a single-phase AC power supply input to the direct power conversion device into AC power having a predetermined frequency through a switching operation of a plurality of switching elements and to supply converted power to a motor configured to drive a load having periodic load fluctuations, the direct power conversion device comprising:
the switching elements; and a control unit configured to control the switching operation in accordance with $$tb=1/|fdc-n \times fL|, \text{ with}$$

tb being a beat period,
fdc being a frequency twice as high as a frequency of the AC power supply,
fL being a frequency of the periodic load fluctuations, and
n being a positive integer that maximizes tb, and in a half period of power supply during the beat period, the half period of power supply including a timing at which a peak of a fundamental wave of load torque and a peak of an absolute value of a power supply voltage substantially coincide with each other, the control unit being configured to control the switching elements so that two or more local maximum points appear in the half period of power supply, in a waveform obtained by combining a second harmonic, a fourth harmonic, and a sixth harmonic of a power supply frequency contained in a waveform of an absolute value of a motor current vector.

2. The direct power conversion device of claim 1, wherein in a half period of power supply including a timing at which the fundamental wave of the load torque is at its maximum, the control unit is configured to control the switching elements so that two or more local maximum points appear in the half period of power supply, in a waveform obtained by combining a second harmonic, a fourth harmonic, and a sixth harmonic of a power supply frequency contained in a waveform of an absolute value of a motor current vector.

3. The direct power conversion device of claim 1, wherein in a half period of power supply included in a phase range of a mechanical angle in which the fundamental wave of the load torque exceeds a predetermined threshold value, the control unit is configured to control the switching elements so that two or more local maximum points appear in the half period of power supply, in a waveform obtained by combining a second harmonic, a fourth harmonic, and a sixth harmonic of a power supply frequency contained in a waveform of an absolute value of a motor current vector.

* * * * *